United States Patent [19]

Hilgren

[11] Patent Number: 4,692,251

[45] Date of Patent: Sep. 8, 1987

[54] SOLVENT CLEANSING APPARATUS

[76] Inventor: Wallace L. Hilgren, 7204 Fleetwood Dr., Minnesota, Minn. 55435

[21] Appl. No.: 882,540

[22] Filed: Jul. 7, 1986

[51] Int. Cl.$^4$ .............................................. B01C 13/00
[52] U.S. Cl. ................................. 210/651; 210/195.2; 210/103
[58] Field of Search ..................... 210/651, 653, 195.2, 210/103

[56] References Cited

U.S. PATENT DOCUMENTS

| | | | |
|---|---|---|---|
| 3,228,876 | 1/1966 | Mahon | 210/653 X |
| 3,977,967 | 8/1976 | Trulson et al. | 210/651 X |
| 4,000,065 | 12/1976 | Lapha et al. | 210/651 X |
| 4,411,790 | 10/1983 | Arod et al. | 210/651 X |
| 4,606,903 | 8/1986 | Hafez et al. | 210/651 X |

Primary Examiner—Frank Spear
Attorney, Agent, or Firm—Merchant, Gould, Smith, Edell, Welter & Schmidt

[57] ABSTRACT

An apparatus is disclosed for cleansing an aliphatic hydrocarbon solvent of an oil based contaminant. The apparatus includes a source of a contaminated solvent and an ultrafiltration filter having a semi-permeable membrane with a pore size selected to pass molecules of the solvent through the membrane and restrict passage through the membrane of molecules of the contaminant. A water cooled jacket is provided for maintaining the temperature of the solvent in the apparatus below a flash point. Pressure switches are provided for maintaining the pressure at the inlet of the ultrafiltration filter below a predetermined maximum to protect the filter. Concentrate of the ultrafiltration filter is recirculated to the source of the contaminated solvent.

8 Claims, 3 Drawing Figures

& # x 2 0 ; 
SOLVENT CLEANSING APPARATUS

BACKGROUND OF THE INVENTION

I. Field of the Invention

This invention pertains to an apparatus for cleansing an aliphatic hydrocarbon solvent. More particularly, this invention pertains to an apparatus for cleansing a solvent of oil based contaminants having physical properties similar to those of the solvent.

II. Description of the Prior Art

In industry, aliphatic hydrocarbon solvents (such as mineral spirits and Stoddard solvents) are widely used in numerous applications. For example, in the machining industry, such solvents are used to wash machined parts of cutting and machining oil. Another use of such solvents is in the automobile service industry where the solvents are used to cleanse away motor oil and other oil based products. The solvents are used to cleanse automobile parts of oil, grease, soot, dirt, road tar, metal filings and other numerous contaminants. An example of such a solvent is the Hi-T ® Degreasol ® solvent marketed by Kleer-Flo Company of Eden Prairie, Minn. The solvents are aliphatic hydrocarbons having physical properties similar to those of the hydrocarbon contaminants which are being removed with the solvents. Accordingly, when the contaminants are removed by the solvents, the contaminants become widely and uniformly dispersed within the solvent.

Through use, solvents become dirty by reason of uniformly dispersed contaminants. The contaminants include a variety of elements such as fine metal particles from machine cutting tools and other particulate matter. In automobile shops, the solvents become contaminated with dissolved oil as well as a large variety of other carbon based products including free carbon particles. Also, as the solvents are repeatedly used to cleanse away oil, dissolved oil content of the solvent builds up. Accordingly, after extended use, the solvent becomes aged. As the solvent becomes used and dirty, the solvent will become obaque. Solvents are typically clear liquids which may be colored through the addition of identifying dies. Through use, the solvents become increasingly dirty such that they obtain a very dark color with the solvent liquid becoming opaque. The difference in appearance between a fresh and a used solvent is remarkable. An individual can clearly see through a vile of fresh solvent. However, after use, the solvent becomes laden with dissolved oil and takes on a muddy, thoroughly dirty, appearance that one cannot see through a vile of used solvent. When the liquid becomes opaque, operators of machine shops or other users of the solvents desire to discard the solvent (even though the opaque solvent may still be functional).

This is apparently due to the muddy appearance of the solvent which makes the solvent look completely used. Due to environmental concerns, spent solvents are generally considered hazardous materials by governmental bodies responsible for environmental protection. Specifically, their unrestricted disposition may adversely affect the environment. As a result, it is becoming increasingly costly to dispose of spent solvents. Also, disposal of a spent solvent is economically undesirable since, even though opaque, the solvent is still useful. However, it is recognized that the industry prefers clean transparent solvents.

To accommodate industry desires, methods have been developed for cleansing contaminated solvents to generate a clean transparent solvent from a dirty opaque solvent. The prior art method of cleansing a contaminated solvent was to boil the solvent in a still. Under controlled pressure and temperature, the clean solvent boils off from the dirty solvent leaving a residue of contaminants which may be separately disposed. The vaporized solvent is separately condensed and collected as a clear marketable product.

While prior art distillation methods and apparatus will produce a cleansed solvent from a contaminated solvent, the prior art methods are undesirable. For example, such stills are very expensive and present a danger of explosion and fire. Such solvents are combustible liquids (as defined in American National Standard ANSI Z129.1-1982 "combustile" means having a flash point at or above 100° F. and less than 200° F.). Operating these types of chemicals within high pressure and temperature stills naturally presents a danger of explosion and fire.

OBJECTS AND SUMMARY OF THE INVENTION

It is an object of the present invention to provide an apparatus for cleansing an aliphatic hydrocarbon solvent of contaminants.

A further object of the present invention is for cleansing a solvent while maintaining the solvent at a temperature below its flash point.

A still further object of the present invention is to provide an apparatus for cleansing a solvent without the need for using distillation cleansing methods.

According to a preferred embodiment of the present invention, an apparatus for cleansing a contaminant from a solvent is provided. The apparatus includes a source of contaminated solvent and a membrane filtration filter having a semi-permeable membrane. The membrane filter includes a concentrate portion disposed on one side of the membrane and a permeate portion disposed on an opposite side of the membrane. A first conduit connects the source of contaminated solvent to an inlet of the concentrate area. A second conduit is connected to an outlet of the permeate area. The semi-permeable membrane is selected to have a pore size which allows molecules of the solvent to pass through the membrane and restricts passage of molecules of the contaminant.

DESCRIPTION OF THE PREFERRED EMBODIMENT

Figure 1:
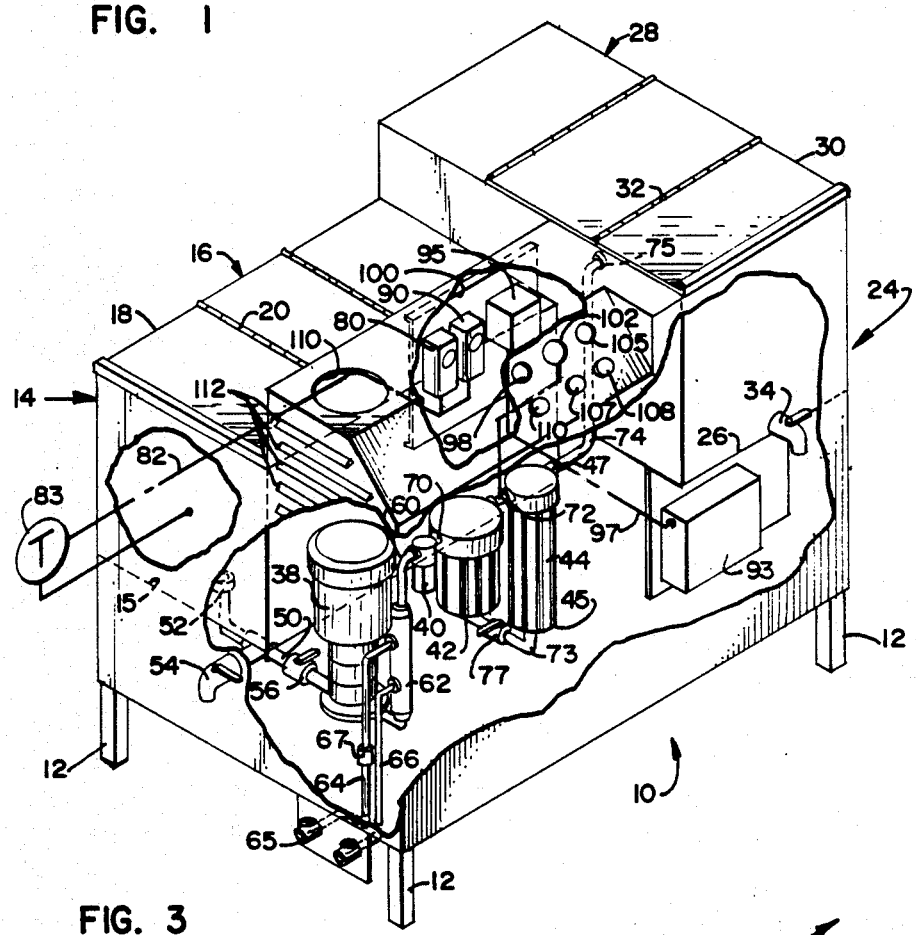
FIG. 1 is a perspective view, shown partially exposed, of a solvent cleansing apparatus of the present invention.
Figure 2:
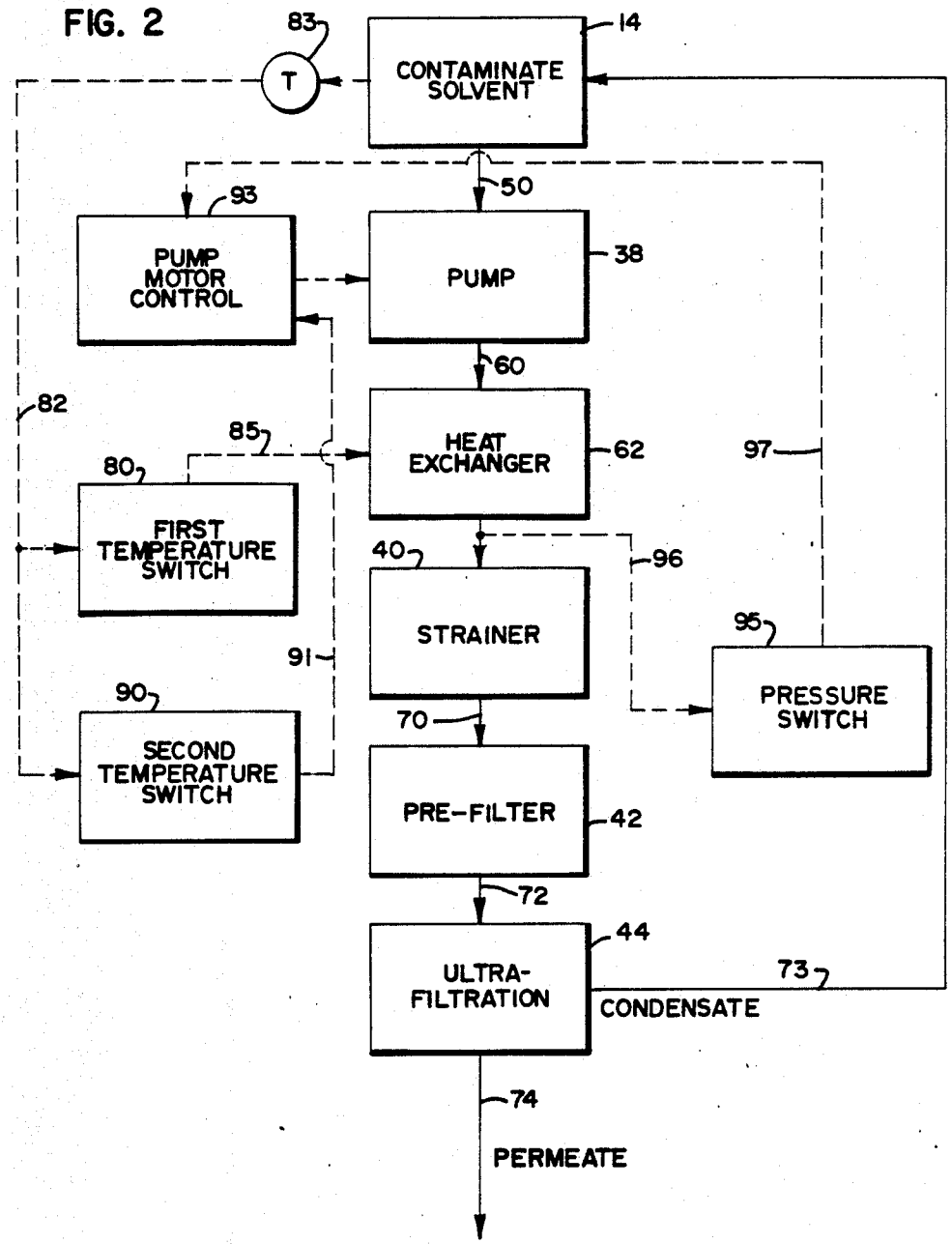
FIG. 2 is a schematic representation of the apparatus of the present invention.

Referring to FIGS. 1 and 2, the apparatus of the present invention is shown. The apparatus includes a support structure 10 having legs 12 for maintaining structure 10 in spaced relation from a work floor. A first tank 14 is mounted on the support structure and includes a cover 16 having a lid 18 which is pivotally secured to cover 16 by means of a piano hinge 20. Lid 18 is pivotable about hinge 20 to expose the interior of tank 14. A screen (not shown) may be located at lid 18 to catch very large pieces of debris when a solvent is poured into tank 14. A second tank 24 is mounted on support structure 10 having a floor 26 spaced above legs 12 a predetermined distance sized to accommodate a desired solvent container (e.g., a 55 gallon drum). Second tank 24 is similar to tank 14 and includes a cover 28 having a lid 30 which is pivotally mounted to cover 28 by a piano hinge 32. Accordingly, lid 30 may be pivotable about hinge 32 to expose the interior of second tank 24. Tank 24 has manually operated outlet spout 34 disposed adjacent floor 26.

The apparatus includes a filtration and control containing housing 36 supported on structure 10. The filtration elements include a pump 38, a strainer 40, a prefilter 42 and an ultrafiltration filter 44. The inlet of pump 38 is connected via a conduit 50 to an outlet 52 disposed on the floor 15 of first tank 14. Intermediate outlet 52 and pump 38 and disposed beneath floor 15 is manually operated outlet spout 54. Disposed within conduit 50 between outlet spout 54 and the inlet of pump 38 is a manually operated on/off valve 56.

The outlet of pump 38 is connected by a conduit 60 to an inlet of strainer 40. Surrounding conduit 60 is a coolant jacket 62 having a coolant inlet conduit 64 and a coolant outlet conduit 66. Inlet conduit 64 is connected via a coupling 65 to a source (not shown) of cooling liquid (preferably cooled water). A valve 67 is disposed within inlet conduit 64 for stopping and starting coolant flow through conduit 64. Valve 67 is preferably a solenoid controlled valve which is operated by the control mechanism 100 of the invention, as will be described.

The outlet of strainer 40 is connected to the inlet of prefilter 42 by means of a conduit 70 which contains a first pressure sensor (not shown) for detecting the pressure of fluid within conduit 70 at the inlet of prefilter 42. The outlet of prefilter 42 is connected via conduit 72 to the inlet of ultrafiltration filter 44. Ultrafiltration filter 44 has a concentrate outlet 45 with a conduit 73 connecting outlet 45 to an inlet (not shown) of first tank 14 disposed at the top of tank 14. Ultrafiltration filter 44 also has a permeate outlet 47 connected via conduit 74 to an inlet 75 disposed at the top of second tank 24.

The control mechanism 100 of the apparatus includes a first temperature switch 80. Circuitry, indicated schematically at 82, connects temperature switch 80 to any commercially available temperature sensing device (such as a bulb and capillary thermostat) 83 disposed within first tank 14 for sensing the temperature of contaminated solvent within tank 14. Temperature switch 80 is a commercially available apparatus and controls (via circuitry schematically shown at 85 in FIG. 2) solenoid valve 67 to open valve 67 and admit coolant to jacket 62 when the temperature sensed by 83 exceeds a first preset temperature. A second commercially available temperature switch 90 is provided connected to a thermostat by circuitry. While each temperature switch 90 will have its own dedicated thermostat, for convenience, switch 90 is shown connected to thermostat 83 by circuitry 82. Like switch 80, switch 90 is a commercially available item and is connected via line 91 (schematically shown in FIG. 2) to pump motor control 93 to shut off pump 38 when therostat 83 detects a temperature in excess of a second predetermined temperature which is established to be greater than the first predetermined temperature of switch 80.

The control apparatus 100 also includes a high pressure switch 95 connected via input line 96 to any commercially available pressure sensing device (not shown) located at the inlet of strainer 40. The pressure sensing device is also connected to an operator readable gauge 98 located on a control face 99 of housing 36. Pressure switch 95 is a commercially available item and is connected to via line 97 pump motor control element 93 to effect shut off of the pump 38 when the pressure detected at the inlet to strainer 40 exceeds a predetermined pressure. A second operator readable gauge 102 is connected via a line 103 to a pressure sensing device (not shown) at the inlet of the ultrafiltration filter 44. The control panel 99 also includes an operator readable temperature gauge 105 which is connected to a thermostat (here shown as thermostat 83). Finally, the control panel 99 includes manually engageable buttons 107, 108 for starting and stopping the pump control motor 93 and an indicator light 110 indicating that the machine is operating. An air vent 110 and louvers 112 provide air flow openings to cool the motor of pump 38 during operation.

Figure 3:
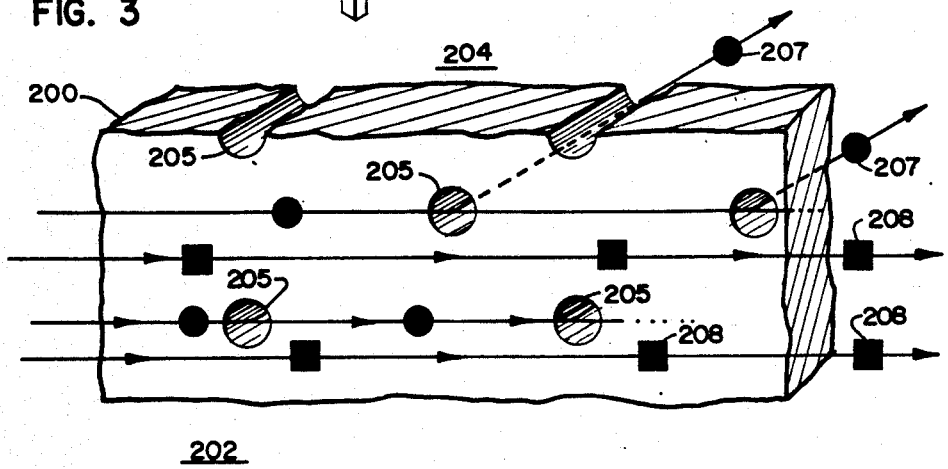
FIG. 3 is a schematic representation of the membrane filter of the present invention.

Aliphatic hydrocarbon solvents (such as mineral spirits) used to cleanse machined parts of machining and cutting oils break down the oil with the result that the oil is uniformly dispersed within the solvent. As a result, any attempt to separate the oil from the solvent is extremely difficult in that such an attempt requires a reversal of the natural propensity of the oil to be uniformly dispersed within the solvent. I have found that an ultrafiltration membrane type filter can be employed to separate dissolved oil from such solvent. While ultrafiltration filters such as filter 44 are commercially available items, their use to separate oils from solvents has not been employed and the art has not forseen the surprising results achieved through using an ultrafiltration filter to effect separation of the dispersed oil in the solvent. An ultrafiltration filter is schematically shown in FIG. 3 and includes a membrane 200 to separate the filter between a condensate side 202 and a permeate side 204. The membrane 200 is semi-permeable and includes a plurality of extremely small pores 205 of controlled size. The membrane 200 is selected such that the pores 205 are sufficiently small to pass molecules of the solvent but restrict passage of molecules of the contaminating oil and other particles which make the solvent opaque. By admitting contaminated solvent under pressure to the inlet of the condensate side 200, the molecules 207 of the solvent pass through pores 205 and may be drawn off of the permeate side 204. The molecules 208 of the contaminating oil and the other contaminants contributing to opacity may not pass through pores 205 and are drawn off of an outlet of the condensate side 202.

It is important to select a membrane having pore sizes sufficient to readily pass the molecules 207 of the solvent while blocking passage of the molecules 208 of the contaminants. It will be appreciated that the contaminates 208 come within a range of molecular weights and that the solvent molecules 207 also have a range of molecular weights. Also, if pore size 205 is too small, the operating pressure of the system must be greatly increased. I have determined that a pore size less than 0.1 micrometers will cleanse a solvent of uniformly dispersed contaminants which make the solvent opaque. Preferably, the pore size will have a micrometer rating of about 0.001 to effect the optimum separation of clean solvent and maintain the apparatus at an optimum operating pressure range. A preferred pressure range for the fluid flow through the ultrafiltration filter 44 will be between 20 and 150 psi. The actual operating pressure will be constrained by the ratings of the various plumbing elements (such as pipes, fittings and filter cannisters) used in the apparatus. An increase in pressure in the condensate sides 202 of filter 44 will result with an increased flow rate of permeate exiting through conduit 74.

To protect filter 44 and reduce the load on filter 44, strainer 40 and prefilter 42 are provided. Prefilter 42 is a conventional filter of the cartridge type sized to filter particles of one micron or larger. Strainer 40 is a mesh strainer rated at 100 mesh. As a result, contaminated solvents exiting prefilter 42 have contaminants sized one micron or less which greatly reduces the burden on ultrafiltration filter 44. The specifics of prefilter 42 and strainer 40 are selected to reduce the burden on ultrafiltration filter 44 and reduce necessary shutdown time to clean or replace strainer 40 and prefilter 42.

Pressure switch 95 determines the pressure at the inlet to strainer 40. When the pressure at the inlet to strainer 40 exceeds a predetermined maximum pressure (selected to avoid damage to the plumbing elements of the apparatus), switch 95 automatically shuts off pump motor control 93 to prevent damage to the porous membrane 200 of ultrafiltration filter 44. The pressure at the inlet of strainer 40 is indicated on gauge 98. Gauge 102 indicates the pressure at the inlet of filter 44. By comparing the indicated pressures at gauges 98 and 103, an operator can determine the status of the strainer 40 and prefilter 42 and the ultrafiltration filter 44 to determine if they are clogged or if they need replacement.

As previously mentioned, the solvents used in oil cleansing are combustible and have a flash point between 100° F. and 200° F. To maintain the temperature of the solvent below its flash point, cooling jacket 62 controls the temperature of the solvent within the apparatus. The solvent temperature is determined by thermostat 83 with the signal sent to first switch 80. Switch 80 determines whether the sensed temperature is above a first predetermined maximum temperature. In a preferred embodiment, the first predetermined maximum temperature will be set to be less than 85° F. and optimally will be set at 80° F. If the predetermined maximum is exceeded, switch 80 operates solenoid activated valve 67 to admit flow of coolant to jacket 62 to cool the temperature of the solvent below the predetermined maximum. Once the temperature of the solvent is reduced, valve 67 is turned off to reduce the amount of cooling water required for the apparatus and to keep the temperatures from going below a preferred minimum. For example, I have found the yield of the apparatus is best when the solvent temperature is above 60° F.

If, for any reason, switch 80 or valve 67 should fail such that the temperature of the solvent increases, the second temperature switch 90 will be engaged to trip the pump motor control 93 and turn off the apparatus when the temperature of the solvent exceeds the second predetermined maximum temperature. In the preferred embodiment, the second maximum temperature is set at 90° F. Finally, temperature gauge 105 permits an operator to note the temperature and to manually control the apparatus through start and stop switches.

In addition to the automatic controls, valve 56 may be adjusted to manually control solvent flow through the entire apparatus. Valve 77 can be adjusted to manually control flow and pressure through ultrafiltration filter 44.

In operating the apparatus, the permeate (or cleansed solvent) passes through conduit 74 into tank 24 where it is collected. Condensate (solvent with a now increased concentration of contaminants) is returned to tank 14 through conduit 73. In practice the greater percentage of liquid entering filter 44 is eventually returned to tank 14. The percent passed to tank 24 as clean solvent may generally be increased by increasing the pressure of the apparatus (e.g. by adjusting valve 77). After continuous operation, the concentration of contaminants in tank 14 may be too high to clean effectively. At this point, this residue material may be drawn off by closing valve 56 and opening outlet spout 54.

With the apparatus of the present invention I have obtained surprisingly good results in cleansing contaminated solvents. Specifically, in using for example an oil contaminated Hi-T® Degreasol® solvent, I have managed to reduce the dispersed oil content of solvents from about 5% by weight to about 2% by weight. More importantly, by passing a contaminated solvent through the apparatus, I have cleansed a fully opaque solvent to a state where it is visually indistinguishable from a virgin solvent. This latter result is highly important in that users of the solvent prefer visually clear solvents even though the opaque solvents may be adequate for cleansing purposes.

From the foregoing detailed description of the present invention, it has been shown how the objects of the invention have been attained in the preferred manner. However, modifications and equivalents of the disclosed concepts, such as readily occur to those skilled in the art, are intended to be included in the scope of this invention. Thus, the scope of this invention is intended to be limited only by the scope of the claims as are, or may hereafter be, appended hereto.

What I claim is:

1. An apparatus for cleansing an aliphatic hydrocarbon solvent of the type having flash point temperatures in a range of about 100° F. to about 200° F. wherein said solvent is contaminated by a uniformly dispersed oil based contaminant; said apparatus comprising:

a source of a contaminated aliphatic hydrocarbon solvent of the type having flash point temperatures in a range of about 100° F. to about 200° F., said solvent being contaminated by a uniformly dispersed oil based contaminant;

conduit means connected to an outlet of said source;

particulate filter means disposed within said conduit means to filter from said solvent contaminants sized greater than a predetermined minimum size;

membrane filtration means disposed within said conduit subsequent to said particulate filtration means, said membrane filtration means having a semipermeable membrane and said membrane filtration means having a concentrate portion disposed on one side of said membrane and a permeate portion disposed on an opposite side of said membrane;

said conduit means disposed to connect an outlet of said particulate filter means to an inlet of said concentrate portion;

a conduit connecting an outlet of said concentrate portion with an inlet of said source and a conduit connected to an outlet of said permeate portion;

temperature control means for maintaining said solvent within said apparatus at a temperature below a flash point temperature of said solvent;

pump control means for controlling an operating pressure of said apparatus below a predetermined maximum pressure;

said membrane having a pore size selected to pass molecules of said solvent through said membrane and restrict passage through said membrane of molecules of said contaminant; and pump means for circulating solvent through said apparatus.

2. An apparatus according to claim 1 wherein said membrane filtration filter is an ultrafiltration filter.

3. An apparatus according to claim 2 wherein said pore size is less than 0.1 micrometers.

4. An apparatus according to claim 1 wherein said pump control means includes means for detecting a pressure of fluid admitted to said inlet of said concentrate portion and disengaging said pump means when said detected pressure exceeds a predetermined maximum.

5. An apparatus according to claim 1 wherein said temperature control means includes cooling means for cooling said solvent to a temperature approximating a predetermined desired operating temperature.

6. An apparatus according to claim 5 wherein said temperature control means further includes means for stopping said pump means when the temperature of said solvent exceeds a predetermined safety temperature.

7. An apparatus for cleansing an aliphatic hydrocarbon solvent of the type having flash point temperatures in a range of about 100° F. to about 200° F., wherein said solvent is contaminated by a uniformly dispersed oil based contaminant, said apparatus comprising:

a source of a contaminated aliphatic hydrocarbon solvent of the type having flash point temperatures in a range of about 100° F. to about 200° F., said solvent being contaminated by a uniformly dispersed oil based contaminant;

conduit means connected to an outlet of said source;

particulate filter means disposed within said conduit means to filter from said solvent contaminants sized greater than a predetermined minimum size;

membrane filtration means disposed within said conduit subsequent to said particulate filtration means, said membrane filtration means having a semi-permeable membrane and said membrane filtration means having a concentrate portion disposed on one side of said membrane and a permeate portion disposed on an opposite side of said membrane;

said conduit means disposed to connect an outlet of said particulate filter means to an inlet of said concentrate portion;

a conduit connecting an outlet of said concentrate portion with an inlet of said source and a conduit connected to an outlet of said permeate portion;

means for monitoring said temperature and cooling said solvent within said apparatus to a temperature approximating a predetermined desired operating temperature;

pump control means for controlling an operating pressure of said apparatus below a predetermined maximum pressure;

said membrane having a pore size selected to pass molecules of said solvent through said membrane and restrict passage through said membrane of molecules of said contaminant;

pump means for circulating solvent through said apparatus; and means responsive to said monitored temperature for stopping said pump means when the temperature of said solvent exceeds a predetermined safety temperature wherein said safety temperature is selected to be less than a flash point temperature of said solvent.

8. A method for cleansing an aliphatic hydrocarbon solvent of the type having flash point temperatures in a range of about 100° F. to about 200° F. wherein said solvent is contaminated by a uniformly dispersed oil based contaminant, said method comprising:

prefiltering said contaminated solvent in a particulate filter selected to filter from said solvent contaminants sized greater than a predetermined minimum size;

filtering at least a portion of said oil based contaminant from said solvent subsequent to said prefiltering with said filtering performed in membrane filtration means having a semi-permeable membrane with a concentrate portion disposed on one side of said membrane and a permeate portion disposed on an opposite side of said membrane;

recycling a concentrate solvent from said concentrate portion and admixing said concentrate with contaminated solvent to form a mixture thereof and prefiltering and filtering said mixture of said concentrate solvent and said contaminated solvent;

passing solvent from said permeate portion to an outlet;

monitoring a temperature of solvent within said apparatus;

cooling said solvent until said temperature approximates a predetermined desired operating temperature;

discontinuing said filtering and prefiltering if a monitored temperature exceeds a predetermined safety temperature;

monitoring a pressure of said solvent; and discontinuing said filtering and prefiltering if a monitored pressure exceeds a predetermined maximum.

* * * * *